United States Patent [19]
Puskorius et al.

[11] Patent Number: 5,781,700
[45] Date of Patent: Jul. 14, 1998

[54] TRAINED NEURAL NETWORK AIR/FUEL CONTROL SYSTEM

[75] Inventors: Gintaras Vincent Puskorius, Redford; Lee Albert Feldkamp, Plymouth; Leighton Ira Davis, Ann Arbor, all of Mich.

[73] Assignee: Ford Global Technologies, Inc., Dearborn, Mich.

[21] Appl. No.: 597,080

[22] Filed: Feb. 5, 1996

[51] Int. Cl.$^6$ .................... G06F 15/00; G06F 15/18
[52] U.S. Cl. ................. 395/20; 395/22; 395/23; 395/905
[58] Field of Search ................. 395/23, 22, 20, 395/905

[56] References Cited

U.S. PATENT DOCUMENTS

| | | | |
|---|---|---|---|
| 4,506,639 | 3/1985 | Murakami et al. | 123/339.1 |
| 4,625,697 | 12/1986 | Hosaka | 123/478 |
| 4,899,280 | 2/1990 | Onari et al. | 364/431.051 |
| 5,041,976 | 8/1991 | Marko et al. | 364/431.04 |
| 5,048,495 | 9/1991 | Onari et al. | 123/492 |
| 5,050,562 | 9/1991 | Ishii et al. | 364/431.051 |
| 5,099,429 | 3/1992 | Onari et al. | 364/431.051 |
| 5,200,898 | 4/1993 | Yuhara et al. | 395/905 |
| 5,247,445 | 9/1993 | Miyano et al. | 395/23 |
| 5,361,213 | 11/1994 | Fujieda et al. | 395/905 |
| 5,410,477 | 4/1995 | Ishii et al. | 364/431.04 |
| 5,434,783 | 7/1995 | Pal et al. | 364/424.05 |
| 5,479,573 | 12/1995 | Keeler et al. | 395/23 |
| 5,598,509 | 1/1997 | Takahashi et al. | 395/22 |
| 5,625,750 | 4/1997 | Puskorius et al. | 395/22 |

OTHER PUBLICATIONS

"Automotive Engine Idle Speed Control with Recurrent Neural Networks" by G. V. Puskorius and L. A. Feldkamp, Research Laboratory, Ford Motor Company; In Proceedings of the 1993 American Control Conference; pp. 311 to 316.

Puskorius et al, "Truncated Backpropogation Through Time and Kalman Filter", Proceedings of the 1994 IEEE Inter. Conf. on Neural Networks, vol. IV, pp. 2488–2493.

Puskorius et al, "Recurrent Network Training with the Decoupled Extended Kalman Filter Algorithm", Proceedings of the 1992 SPIE Conference on the Science of Artificial Neural Networks, Orlando 1992.

(List continued on next page.)

*Primary Examiner*—George B. Davis
*Attorney, Agent, or Firm*—Allan J. Lippa

[57] ABSTRACT

An electronic engine control (EEC) module executes both open loop and closed loop neural network processes to control the air/fuel mixture ratio of a vehicle engine to hold the fuel mixture at stoichiometry. The open loop neural network provides transient air/fuel control to provide a base stoichiometric air/fuel mixture ratio signal in response to throttle position under current engine speed and load conditions. The base air/fuel mixture ratio signal from the open loop network is additively combined with a closed loop trimming signal which varies the air/fuel mixture ratio in response to variations in the sensed exhaust gas oxygen level. Each neural network function is defined by a unitary data structure which defines the network architecture, including the number of node layers, the number of nodes per layer, and the interconnections between nodes. In addition, the data structure holds weight values which determine the manner in which network signals are combined. The network definition data structures are created by a network training system which utilizes an external training processor which employs gradient methods to derive network weight values in accordance with a cost function which quantitatively defines system objectives and an identification network which is pretrained to provide gradient signals representative of the behavior of the physical plant. The training processor executes training cycles asynchronously with the operation of the EEC module in a representative test vehicle.

13 Claims, 4 Drawing Sheets

OTHER PUBLICATIONS

Feldkamp et al. "Neural Control Systems Trained by Dynamics Gradient Methods for Automotive Applications." IEEE ICNN, 1992.

Puskorius et al. "Neuro Control of Nonlinear Dynamical Systems with Kalman Filter Trained Recurrent Networks", IEEE Transactions on Neural Networks, 1994.

Narendara et al. "Gradient Methods for the Optimization of Dynamical Systems Containing Neural Networks", IEEE Transactions on Neural Networks, 1991.

Narendara et al. "Identification and Control of Dynamical Systems Using Neural Networks", IEEE Transactions on Neural Networks, 1990.

TRAINED NEURAL NETWORK AIR/FUEL CONTROL SYSTEM

FIELD OF THE INVENTION

This invention relates to neural network control systems and more particularly to methods and apparatus for developing and deploying a neural network system for controlling the rate at which fuel is delivered to an internal combustion engine.

BACKGROUND OF THE INVENTION

Current approaches to the development of automotive engine controllers are based largely upon analytical models that contain idealizations of engine dynamics as currently understood by automotive engineers. However, automotive engines are complicated systems, and many aspects of their dynamical behaviors are not yet well understood, thereby leading to inexact or incomplete engine models. The dynamics of each engine class varies in detail from one class to another, often resulting in dynamical behaviors that are apparently unique to a given engine class. In addition, model-based approaches to controller strategy development require that the actuators and sensors which form part of the engine system be appropriately characterized and included in the model from which a controller can be analytically synthesized.

Once a control strategy has been designed on the basis of an idealized model, the strategy is then calibrated by adjusting parameters, usually in the form of look-up tables, to achieve a desired performance or behavior. This calibration is usually performed by hand, which can be extremely time consuming considering the number of adjustable parameters that may be potentially adjusted. If the desired performance cannot be achieved via strategy calibration, the engine model is modified, a new or augmented strategy is synthesized, and the calibration for the new strategy is attempted. This cyclic process is repeated until the desired performance is achieved.

SUMMARY OF THE INVENTION

The present invention takes the form of a neural network-based approach to the development and calibration of an air/fuel control system. In accordance with the invention, a neural network control module provides a base level output fuel control command during the background period of an electronic engine control (EEC) module based on engine operating condition status signals available to the module. The neural network control module is trained to maintain a stoichiometric air/fuel mixture under changing engine conditions as indicated by input signals supplied to the module from external sensors.

The neural network weight values which in part define its dynamic behavior are trained during a calibration process to take into account a complex set of engine operating characteristics which impact air/fuel control performance, including dynamic phenomena such as wall wetting, variable time delays, and the matching of fuel flow to the measurement of mass air flow. The training methods and apparatus used to define the neural network parameters do not require mathematical modeling of engine behavior, but are rather data driven by the performance of a representative physical system, including the engine, the loads and disturbances which affect engine performance, and the behavior of the electronic engine control module which controls the engine, all of which are exercised in their natural operating modes during the training.

In accordance with the invention, the neural network system may advantageously take the form of a first network for performing open loop control which receives external inputs indicative of engine speed, mass air flow rate and throttle position, and a second neural network for performing closed loop control which receives inputs indicative of the exhaust gas oxygen level, engine speed and engine load. Both neural networks may be implemented by a single generic neural network program which executes in the EEC module and which addresses values in a network definition data structure associated with each network implemented.

The neural networks are developed and calibrated by apparatus comprising: a representative vehicle equipped with an engine, an EEC system, actuators and sensors that are characteristic of those found on the particular vehicle line to be calibrated; an external training processor containing data acquisition hardware that allows communication with the vehicle's EEC, preferably by means of a shared memory from which both the EEC and the training processor can access input and output signal values as well as the neural network weight values; and programs executable by the external training processor for training the neural network by initializing and then optimizing the neural network weight values utilized by the EEC. With the vehicle running, relevant signals (e.g., sensor outputs, actuator commands, flags, etc.) are processed by the EEC and are made available to the external training processor. These signals are used as inputs to a neural network controller implemented as a data structure in the external computer's neural network training program as well as a data structure in the memory addressed by the EEC module. Based on these signals (measured at background loop intervals established by the EEC), the neural network training program carries out asynchronous training (i.e., the weight values of the neural network are updated asynchronously with the computation of control signals by the EEC). At every background loop, the EEC module executes a generic neural network processing routine with the currently available weight values to provide control signals to the vehicle. The transfer of weight values may advantageously be implemented by means of a shared memory addressable by both the EEC module and the training processor.

The external training processor employs a dynamic gradient method to update the neural network controller's weight parameters, and preferably utilizes a decoupled extended Kalman filter (DEKF) training algorithm or, alternatively, a simpler but possibly less effective gradient descent mechanism.

In accordance with the invention, the training method develops neural network weights by directly monitoring the air/fuel ratio responses of the representative development vehicle and its controller. The training process for a controller network utilizes an identification network which models the engine's exhaust gas oxygen level as a function of relevant engine variables, the identification network being developed by off line processing in advance of the process for training the open loop neural network controller weights. The training process optimizes the network weights for each network in accordance with a cost function which quantifies the desired behavior of the controller/engine combination, penalizing deviations in the air/fuel ratio from a nominal stoichiometric value, and further evaluating other monitored relationships which further define the engine's desired operating characteristics.

These and other features and advantages of the present invention may be more clearly understood by considering the following detailed description of a specific embodiment of the invention. In the course of the description to follow, numerous references will be made to the attached drawings.

DESCRIPTION OF THE PREFERRED EMBODIMENT

The present invention may be used to advantage to develop, calibrate and deploy neural networks for performing both open loop transient air/fuel control and closed loop air/fuel control responsive to exhaust gas oxygen levels. In a conventional adaptive closed loop fuel control system, the rate at which fuel is delivered to the engine is given by the relationship:

$$\text{FUEL} = \frac{am * kamref}{14.64 * lambse} + TFuel$$

where am represents the mass air flow rate (the cylinder air charge computed in the EEC's foreground process) and kamref is a correction factor stored in adaptive fuel tables, having a default value of unity but varying by an amount established by an adaptive learning process which compensates for manufacturing and environmental variations to help maintain stoichiometry. The value 14.64 represents the nominal stoichiometric air/fuel ratio, and lambse is the primary fuel control signal computed in the EEC's background process in response to variations in the sensed exhaust gas oxygen level. The value Tfuel is a further correction value determined by a transient fuel compensation strategy.

When lambse is being increased, the effect is a reduction of the fuel flow, which progressively leans out the air/fuel mixture. On the other hand, when lambse is decreasing, fuel flow is increasing and the air/fuel mixture is enriched. Typically, the value for lambse is the output of a feedback (closed loop) limit cycle controller and consists of jumps and ramps that vary with the output of a heated exhaust gas oxygen (HEGO) sensor, with further dependence on engine speed and engine load. On average, the value of lambse is approximately 1.0 and, under steady state conditions, the production strategy is calibrated so that the correction Tfuel=0.

Figure 3:
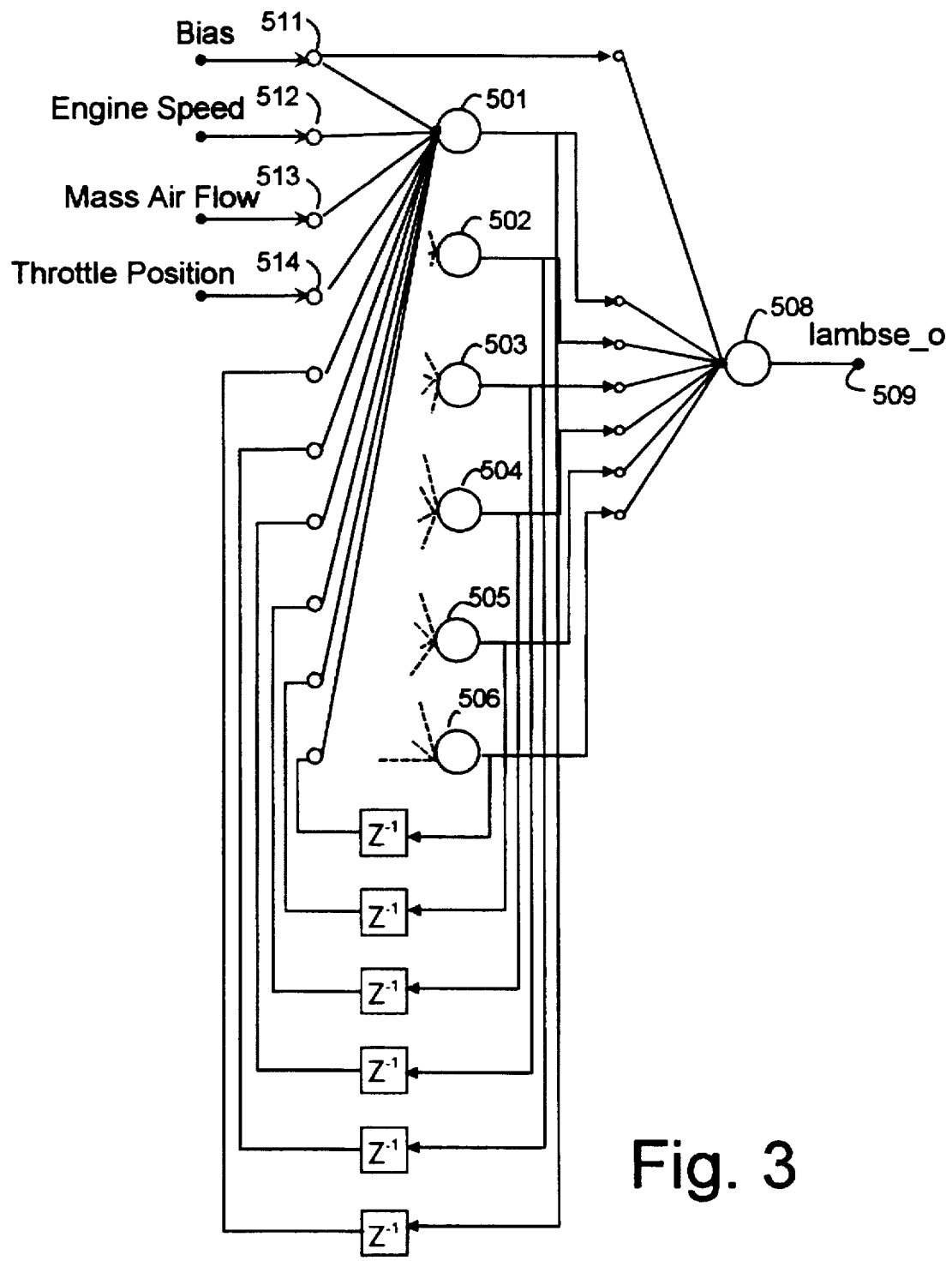
FIG. 3 is a schematic diagram of a recurrent neural network architecture adapted to perform open loop transient air/fuel control of the type developed and deployed using the invention.

The variable lambse may be usefully considered to be the combination of both closed loop and open loop transient components, so that Tfuel is always equal to zero. Such a composite lambse command, lambse_t, may be expressed as the sum of two parts:

$$lambse\_t = lambse\_o + lambse\_c$$

where lambse_o is the base level plus transient open loop A/F control which can be advantageously provided by a trained neural network of the type shown in FIG. 3, and lambse_c is the output of a closed-loop feedback controller which can also be advantageously provided by a neural network responsive to exhaust oxygen level, engine speed and engine load. It is the task of the closed loop controller to trim the output of the open loop controller so that a stoichiometric air/fuel mixture is maintained under all conditions. The output of the open loop controller, lambse_o, is a signal whose ideal average value is unity, while lambse_c, the output of the closed loop controller, is a signal whose ideal average value is zero.

In the description to follow, methods and apparatus are disclosed for developing and deploying a neural network for performing both open loop, transient A/F control and closed loop, feedback A/F control to generate the composite value lambse_t. Both control elements are preferably implemented in production vehicles by a single generic neural network program which executes on the vehicle's EEC module in a manner defined, for each network, by a network definition data structure which defines both the architecture and the weight values of the network.

Figure 1:
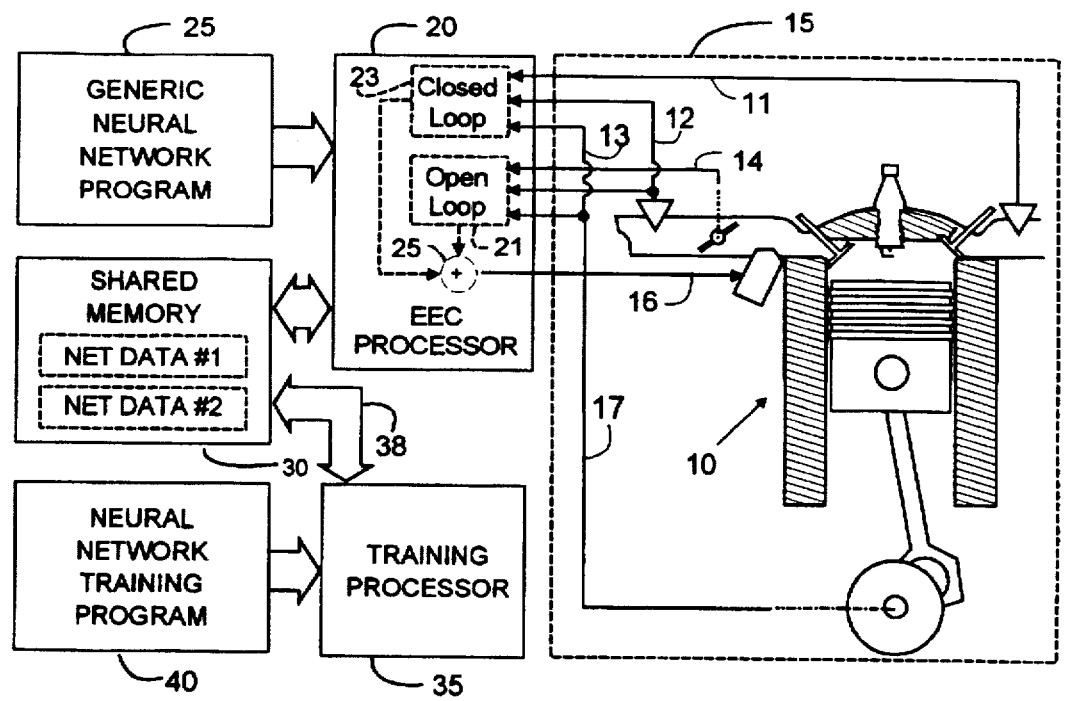
FIG. 1 is a block diagram illustrating the principle components used to develop and calibrate a neural network air/fuel control system as contemplated by the invention.

As seen in FIG. 1, the air/fuel control network processing contemplated by the invention is performed by an electronic engine control (EEC) processing module 20 which controls a vehicle engine system (plant) 15 as illustrated in FIG. 1. As will be described, the EEC module 20 may advantageously perform a variety of neural network control functions, including open loop air/fuel control as schematically shown at 21 and closed loop control as seen at 23, by executing a single generic neural network control program 25 stored in memory. The output of the open loop control 21, lambse_o, is added to the output lambse_c of the closed loop control 23 as indicated at 25 to form the fuel rate command signal 16 which controls the fuel injectors in the engine 10.

In a production vehicle, the data defining the open loop and closed loop neural networks' architectures and weight values are stored in a read-only memory (not shown). During the prototyping stage, this network definition data is instead stored in a shared memory unit 30. To facilitate the development of the network architectures and weight values contained in this data, the generic execution module 20 is interactively coupled to a training processor 35 during a prototyping period, with data being communicated between the two processors via the shared memory 30.

The engine 10 and other relevant vehicle components are illustrated in FIG. 1 as forming a physical plant indicated by the dashed rectangle 15. As seen in FIG. 1, the fuel delivery rate to the engine 10 is controlled by a command signal 16 which determines the fuel injection rate. The plant 15 further includes sensors and other devices which provide input signals, including an exhaust gas oxygen level signal 11, an intake mass air flow rate signal 12, a throttle position signal 14, and an engine speed (rpm) signal 17.

The EEC module 20 comprises a programmed microcontroller which executes, among other routines, the generic neural network control program stored in an EEC program memory 25. The generic control program 25 may implement any one of several neural networks, including the open and closed loop fuel control networks 21 and 23 illustrated in FIG. 1. In a production vehicle, the EEC program memory 25 would further store fixed network definition data and calibration values or "weights" which define each network in read only memory. However, in the development system as seen in FIG. 1, the definition data for each network is stored in data structures which have a predetermined format within the shared memory unit 30.

During the calibration procedure, neural net processing is performed by the EEC module processor 20 while a training algorithm is concurrently executed by the external training processor 35. The two processors communicate with one another by reading and manipulating values in the data structures stored in the shared memory unit 30. The EEC processor 20 has read/write access to the shared memory unit 30 via an EEC memory bus 36 while the training processor 35 has read/write access to the unit 30 via the training processor's memory bus 38. The shared memory unit 30 includes a direct memory access (DMA) controller, not shown, which permits concurrent access to shared data, including neural network definition data, network weights, EEC input and command output values, etc. by both the EEC processor 20 and the training processor 35.

During normal engine operation, the EEC processor 20 performs engine control functions by executing neural network processing in background routines which process input variables and feedback values in accordance with the weights in the network definition data structure to produce output command values. During calibration, while a representative vehicle plant 10 is running under the control of the connected EEC module 20, the training processor 35 accesses the EEC input and output values in the shared memory unit to perform training externally while the EEC module is concurrently performing the neural network processing to generate engine control command values. The neural network training processor carries out training cycles asynchronously with the EEC module's execution of neural network processing. Because training cycles typically require more computation, one or more EEC background routines may be executed for each training cycle.

Figure 2B:
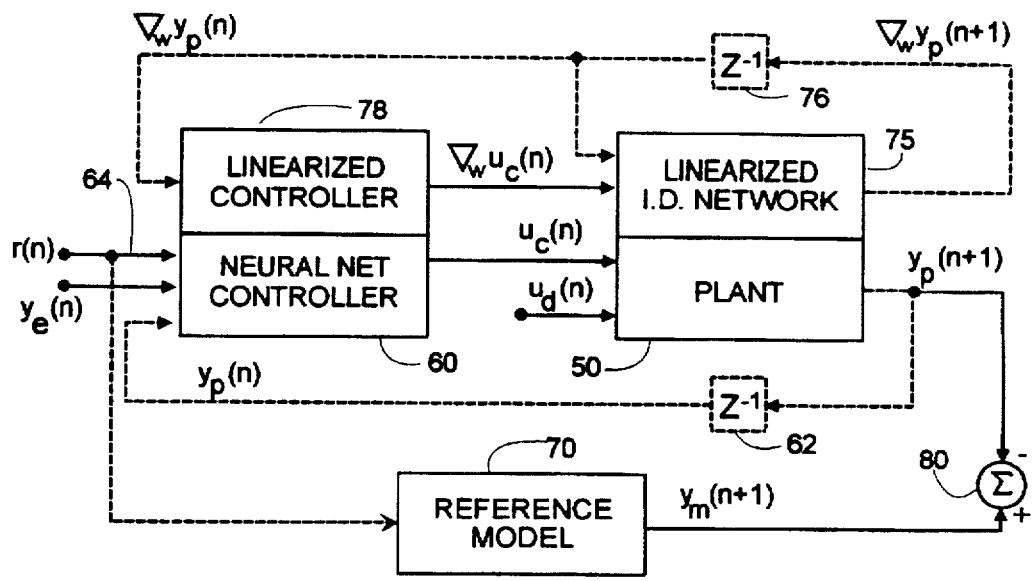
FIGS. 2(a) and 2(b) are signal flow diagrams which illustrate the underlying methodology used by the system of FIG. 1 to calibrate a given neural network in accordance with the invention.
Figure 2A:
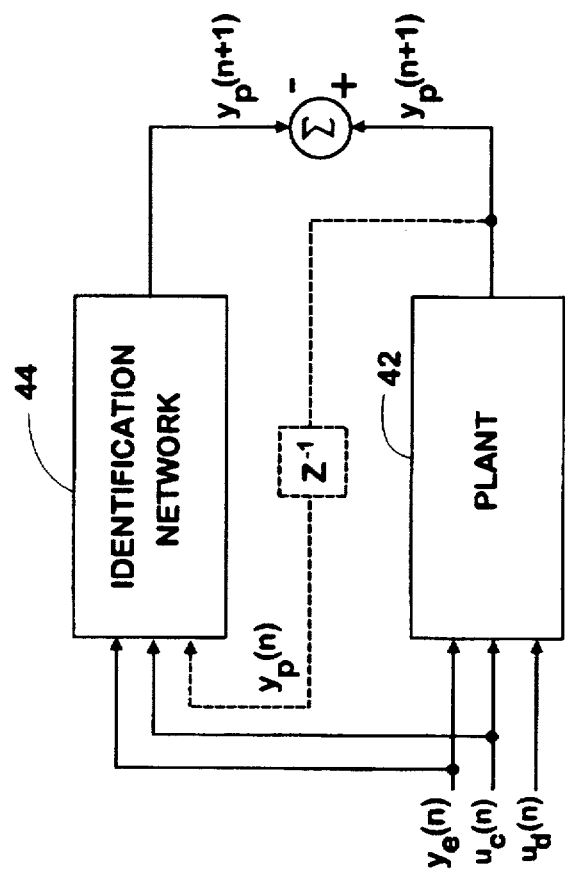

The flow of information during the calibration process is globally illustrated in FIGS. 2(a) and 2(b) of the drawings. FIG. 2(a) shows the manner in which an identification network 44 may be trained by comparing its output to that of a physical plant 42. At a time established by a given processing step n, a generalized physical plant seen at 42 in FIG. 2(a), which includes the engine, its actuators and sensors, and the power train and loads which the engine drives, receives as input a set of imposed discrete time control signals $u_i(n)$ along with asynchronously applied unobserved disturbance inputs $u_d(n)$. The state of the physical plant 42 evolves as a function of these two sets of inputs and its internal state. The output of the plant 42, $y_p(n+1)$, is a nonlinear function of its state and is sampled at discrete time intervals. These samples are compared with $y'_p(n+1)$, the output of an identification network 44, which processes the imposed control signals $u_i(n)$ and the time-delayed plant output to generate an estimate of the plant output at the next discrete time step. Typically, the goal for training of the identification network 44 is to modify the identification network such that its output and the plant output match as closely as possible over a wide range of conditions.

In the case of open loop air/fuel ratio control, for example, the identification network would receive as inputs the imposed lambse__o control signal to form the control signal $u_i(n)$ vector, along with the external engine variables $y_e(n)$ such as engine speed and throttle position. The output of the identification network would thus be predictions, $y'_p(n+1)$, of the air/fuel ratio at the following time step.

The signal flow diagram seen in FIG. 2(b) illustrates how the gradients necessary for neural network controller training by dynamic gradient methods may be generated using an identification network previously trained as illustrated in FIG. 2(a). The plant 50 seen in FIG. 2(b) receives as input a set of discrete time control signals $u_c(n)$ along with asynchronously applied unobserved disturbance inputs $u_d(n)$. The plant's output $y_p(n+1)$ is time delayed and fed back to the input of a neural net controller 60 by the delay unit 62. The neural net controller 60 also receives a set of externally specified feedforward reference signals r(n) at input 64 and external engine variable $y_e(n)$.

Ideally, the performance of the neural network controller 60 and the plant 50 should jointly conform to that of an idealized reference model 70 which transforms the reference inputs r(n) (and the internal state of the reference model 70) into a set of desired output signals $y_m(n+1)$.

The controller 60 produces a vector of signals at discrete time step n which is given by the relation:

$$u_c(n) = f_c(x_c(n), y_p(n), r(n), w)$$

where $f_c(.)$ is a function describing the behavior of the neural network controller as a function of its state at time step n, its feedback and feedforward inputs, reference signals, and weight values. The controller output signals $u_c(n)$ at step n are supplied to the plant 50, which is also subjected to external disturbances indicated in FIG. 2 by the signals $u_d(n)$. Together, these influences create an actual plant output at the next step n+1 represented by the signal $y_p(n+1)$.

The desired plant output $y_m(n+1)$ provided by the reference model 70 is compared to the actual plant output $y_p(n+1)$ as indicated at 80 in FIG. 2. The goal of the training mechanism is to vary the weights w which govern the operation of the controller 60 in such a way that the differences (errors) between the actual plant performance and the desired performance approach zero.

The output of the reference model 70, plant 50, and the comparator 80 may be advantageously used to implement a cost function which imbeds information about the desired behavior of the system. Because the leading goal of air/fuel ratio control is to hold the mixture at stoichiometry, a term in the cost function penalizes any deviation of the air/fuel ratio from a predetermined stoichiometric value. Additional constraints and desired behaviors can be readily imposed by introducing additional terms into the cost function for the neural network controller being developed.

In order to train a controller implemented as a recurrent neural network during the calibration period, a real time learning process is employed which preferably follows the two-step procedure established by K. S. Narendra and K. Parthasarathy as described in "Identification and Control of Dynamical Systems Using Neural Networks," *IEEE Transactions on Neural Networks* 1, no. 1, pp. 4–27 (1991) and "Gradient Methods for the Optimization of Dynamical Systems Containing Neural Networks", *IEEE Transactions on Neural Networks* 2, No. 2, 252–262 (1991), and extended by G. V. Puskorius and L. A. Feldkamp in "Neurocontrol of Nonlinear Dynamical Systems with Kalman Filter Trained Recurrent Networks," *IEEE Transactions of Neural Networks* 5, no. 2, pp. 279–297 (1994).

The first step in this two step training procedure employs a computational model of the behavior of the physical plant to provide estimates of the differential relationships of plant outputs with respect to plant inputs, prior plant outputs, and prior internal states of the plant. The method for developing this differential model, the identification network, is illustrated in FIG. 2(a) and its use for controller training is illustrated in FIG. 2(b), where a linearization of the identification network is performed at each discrete time step n for purposes of gradient calculations as elaborated below. In FIGS. 2(a) and 2(b), the signal pathways used by a closed loop controller and its identification network training system are shown as dashed lines. these pathways not being used for open loop systems.

To train the weights of a neural network controller for performing engine control functions. the identification network may take any differentiable form capable of mapping plant state and the applied command values $u_i(n)$ to a signal value predicting plant behavior. part of $y_p(n+1)$. at the next time step. Such an identification network could itself advantageously take the form of a neural network. The identification network weights for such an identification network are determined prior to the controller training by an off-line procedure during which the vehicle's throttle and spark advance controls are varied through their appropriate ranges while gathering engine speed data. The resulting identification network is then fixed and used for training the neural network weights. as next discussed.

The trained identification network is used in the second step of the training process to provide estimates of the dynamic derivatives (dynamic gradients) of plant output with respect to the trainable neural network weights. The gradients with respect to controller weights of the identification network outputs are a function of the gradients of the controller outputs with respect to controller weights. $\nabla u_c(n)$ as indicated by the linearized controller 78.

The resulting gradients may be used by a simple gradient descent technique to determine the neural network weights as described in the papers by K. S. Narendra and K. Parthasarathy cited above. or alternatively a neural network training algorithm based upon a decoupled extended Kalman filter (DEKF) may be advantageously employed to train both the identification network during off line pre-processing as well as to train the neural network controller during the calibration phase. The application of DEKF techniques to neural network training has been extensively described in the literature. e.g.: L. A. Feldkamp. G. V. Puskorius. L. I. Davis. Jr. and F. Yuan. "Neural Control Systems Trained by Dynamic Gradient Methods for Automotive Applications." *Proceedings of the 1992 International Joint Conference on Neural Networks* (Baltimore. 1992); G. V. Puskorius and L. A. Feldkamp. "Truncated Backpropogation Through Time and Kalman Filter." *Proceedings of the 1994 IEEE International Conference on Neural Networks.* vol. IV. pp. 2488–2493; G. V. Puskorius and L. A. Feldkamp. "Recurrent Network Training with the Decoupled Extended Kalman Filter Algorithm." *Proceedings of the 1992 SPIE Conference on the Science of Artificial Neural Networks (Orlando 1992).* and G. V. Puskorius and L. A. Feldkamp. "Neurocontrol of Nonlinear Dynamical Systems with Kalman Filter Trained Recurrent Networks." *IEEE Transactions of Neural Networks* 5. no. 2. pp. 279–297 (1994).

The organization of an example neural network for providing the open loop transient air fuel function seen at 21 in FIG. 1 is shown in detail in FIG. 3. The network includes six internal nodes 501–506 and a single output node 508 which produces the open loop output signal lambse_o. Four external signals are applied to the four input terminals 511–514 of the network: a constant bias level signal is applied at terminal 511. the engine speed signal (seen at 17 in FIG. 1) is applied at 512. the mass air flow rate signal (seen at 12 in FIG. 1) is applied at 513. and the throttle position signal (seen at 14 in FIG. 1) is applied at 514. These four input signal values are combined with the six node outputs produced by nodes 501–506 from the preceding background loop in accordance with weight values to the inputs of each of the six nodes 501–506. and the outputs from the nodes 501–506 are combined with the bias input at 511 as inputs to the output node 508. also in accordance with weight values.

This hybrid feedforward/feedback neural network architecture receives a stream of three inputs as shown in FIG. 3. all of which are believed to influence the transient air/fuel response of the engine. In addition. the network could receive other signals as input. EEC control signals. such as exhaust gas recirculation (EGR). purge compensation and bypass air. may influence the overall transient A/F response of the engine. Similarly. flag signals which are typically available to the EEC for other purposes and which indicate disturbances. such as the AC_IMMINENT (air conditioner imminent) flag may provide feedforward information that would allow the transient A/F controller to anticipate forthcoming changes in mass air flow or engine speed. In general. the controller's inputs are chosen on the basis of what information is considered to be relevant to the control problem.

Network architectures (i.e.. the number of layers and the number of nodes within a layer. whether feedback connections are used. node output functions. etc) are chosen on the basis of computational requirements and limitations as well as on general information concerning the dynamics of the system under consideration. For example. it is known that air/fuel ratio excursions during transients due to wall wetting require some form of dynamic compensation. Thus. it is imperative that a neural network controller with feedback connections (i.e.. a recurrent neural network of the type shown in FIG. 3) or a neural network controller with a tapped delay line representation of a temporal history of relevant inputs be used so that dynamic compensation can be performed. In accordance with the invention. the rapid deployment and prototyping methods and apparatus contemplated by the present invention greatly facilitate the addition and deletion of input signals during the prototyping stage to select the best combination of signals. as well as an accompanying network architecture for achieving improved results within the computational capabilities of the available processor.

Figure 4:
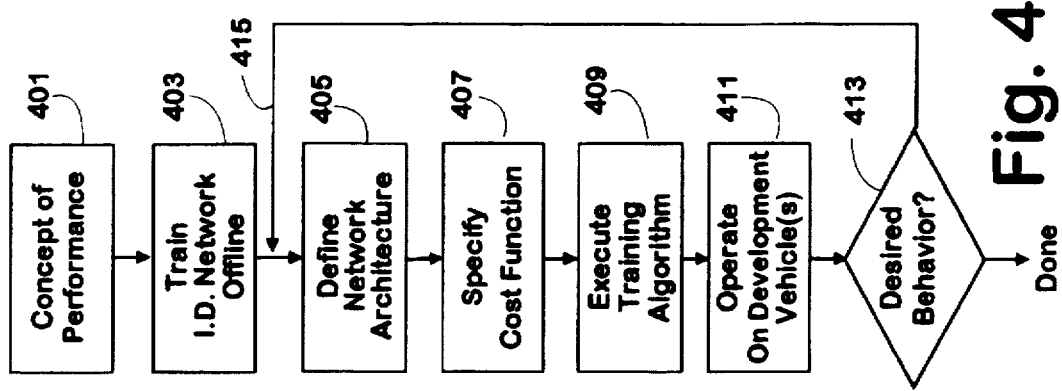
FIG. 4 is a flow chart depicting the overall development procedure followed to develop and deploy a neural network design utilizing the invention.

The overall procedure followed during the calibration process which makes use of the training apparatus described above is illustrated by the overall development cycle flowchart. FIG. 4. Before actual training begins. an initial concept of the desired performance must be developed as indicated at 401 to provide the guiding objectives to be followed during the network definition and calibration process. In addition. before the calibration routine can be executed. the identification network (seen at 75 in FIG. 2) which models the physical plant's response to controller outputs must be trained as indicated at 403.

The next step. indicated at 405. requires that the network architecture be defined; that is. the external signals available to the neural network. the output command values to be generated. and the number and interconnection of the nodes which make up the network must be defined. subject to later modification based on interim results of the calibration process. The particular network architecture (i.e.. the numnber of layers and the number of nodes within a layer. whether feedback connections are used. node output functions. etc.) are chosen on the basis of computational requirements and limitations as well as on general information concerning the dynamics of the system under consideration. Similarly. the inputs are chosen on the basis of what is believed will lead to good control. Values defining the architecture are then stored in a predetermined format in the network definition data structure for that network. Also. as indicated at 407. before controller training can commence. the desired behavior of the combination of the controller and the physical plant must be quantified in a cost function to operate as the reference model 70 seen if FIG. 2.

A representative vehicle forming the physical plant 15 and equipped with a representative EEC controller 20 is then interconnected with the training processor 35 and the shared memory unit 30 as depicted in FIG. 1. The representative test vehicle is then exercised through an appropriate range of operating conditions relevant to the network being designed as indicated at 411.

Neural network controller training is accomplished by application of dynamic gradient methods. As noted above, a decoupled extended Kalman filter (DEKF) training algorithm is preferably used to perform updates to a neural network controller's weight parameters (for either feedforward or recurrent network architectures). Alternatively, a simpler approach, such as gradient descent can be utilized, although that simpler technique may not be as effective as a DEKF procedure. The derivatives that are necessary for the application of these methods can be computed by the training processor 35 by either a forward method, such as real-time recurrent learning (RTRL) or by an approximate method, such as truncated backprogation through time, as described in the papers cited above. The neural network training program (seen at 40 in FIG. 2) is executed by the training processor 35 to compute derivatives and to execute DEKF and gradient descent weight update procedures, thereby determining progressively updated values for the neural network weights which provide the "best" performance as specified by the predefined cost function.

After training is completed, the performance of the trained controller is assessed as indicated at 413 in FIG. 4. This assessment may be made on the same vehicle used during controller training, or preferably on another vehicle from the same class. If the resulting controller is deemed to be unsatisfactory for any reason, a new round of training is performed under different conditions. The change in conditions could include (1) repeating step 405 to redefine the controller architecture by the removal or addition of controller inputs and outputs, (2) a change in the number and organization of nodes and node layers, (3) a change in the cost function or its weight factors by repeating step 407, or (4) a combination of such changes.

Training of neural network controllers for open loop transient air/fuel control by dynamic gradient methods requires knowledge of the differential relationships of system outputs, the air/fuel ratio as measured by a universal exhaust gas oxygen (UEGO) sensor, with respect to system inputs, including the open-loop output lambse_o. This relationship is established by pre-training an identification network that dynamically models the UEGO's output as a function of relevant engine variables as well as imposed controls. Data for training of the identification network is gathered by driving the vehicle under a wide variety of conditions while randomly varying lambse_o about its nominal value of 1.0. Approximately 30 minutes of data are gathered and then used to train the identification network off-line.

As an example, an identification network may be developed to model the UEGO's response as a function of engine speed, mass air flow, throttle position, purge compensation, exhaust gas recirculation, bypass air and lambse_o. The identification network itself may consist of a recurrent neural network consisting of seven inputs, two recurrent hidden layers with 15 and 10 nodes, and a single linear output node. Training of the identification network is performed by off-line processing and the resulting identification network is then fixed and used for training of the open loop transient air/fuel neural network controller. Using a pre-trained identification networks during the controller training process establishes the causal relationship of changes in imposed controls (i.e., changes in lambse_o) and changes in measured inputs with changes in the measured A/F and, based upon this inferred causal relationship, the differential relationship of measured air/fuel with respect to controller parameters can be determined, thereby providing the basis for a gradient-based neural network controller training procedure.

Training of open loop transient air/fuel neural network controller is further driven by a predetermined cost function that embeds information about the desired behavior of the systems. The principal term in the cost function penalizes deviations of measured A/F from stoichiometric A/F. A secondary objective would be for lambse_o to exhibit smooth behavior, especially during steady state conditions; accordingly, a second term in the cost function penalizes large changes in the open loop control signals between two successive time steps. The relative importance of these two components of the cost function is established by two different weight factors. Additional constraints or desired behaviors can be imposed during calibration by introducing additional components into the cost function.

The trained neural network open loop controller can be easily coupled with a closed loop controller that uses information from the HEGO sensor. For example, as shown in FIG. 1, the coupling of the open loop controller 21 with a closed loop controller 23 produces the composite lambse_t control signal at the output of the adder 25 as described above. It may be noted that the closed loop output signal lambse_c is an intregrated signal whose average value is approximately zero, and closed loop control may be achieved by training the recurrent neural network to emulate the closed loop strategy of a production vehicle's closed loop control. The resulting coupled open loop and closed loop systems provide excellent transient disturbance rejection while simultaneously tracking the desired stoichiometric air/fuel ratio using only a HEGO sensor for feedback information. The transient performance of the open loop neural network A/F control strategy developed and deployed in accordance with the invention has been found to be significantly superior to the transient fuel compensation strategy of the production controller.

The closed loop loop air fuel controller may be trained to mimic the performance of a conventional proportional-integral-differential (PID) feedback controller commonly used in EEC control systems. The test vehicle is run to gather data on engine speed, engine load, HEGO sensor output and the resulting PID controller output signal, lambse_c. This testing may be done with an open loop controller output set to lambse_o=1 prior to setting weight values for either controller.

The open loop controller is then trained as previously described with lambse_c set to 0, using a universal exhaust gas oxygen (UEGO) sensor to provide a continuous A/F ratio reading (rather than the switched output provided by a HEGO sensor). In the deployed system, a HEGO sensor may be used for closed loop control with the weight values developed during training with the UEGO sensor.

Once the open loop controller has been trained, it is used to provide a base level fueling signal lambse_o. Either a UEGO or HEGO sensor may be used to provide the oxygen level signal for training the closed loop controller. Data relating the values of lambse_c, engine speed, engine load, and oxygen level is then acquired under a representative range of engine operating conditions. Using this acquired data, the identification network for the closed loop controller is then trained by off line processing, and is subsequently used to generate derivatives of the oxygen level sensor output with respect to the closed loop controller weights using dynamic gradient techniques, with DEKF training being preferable.

Figure 5:
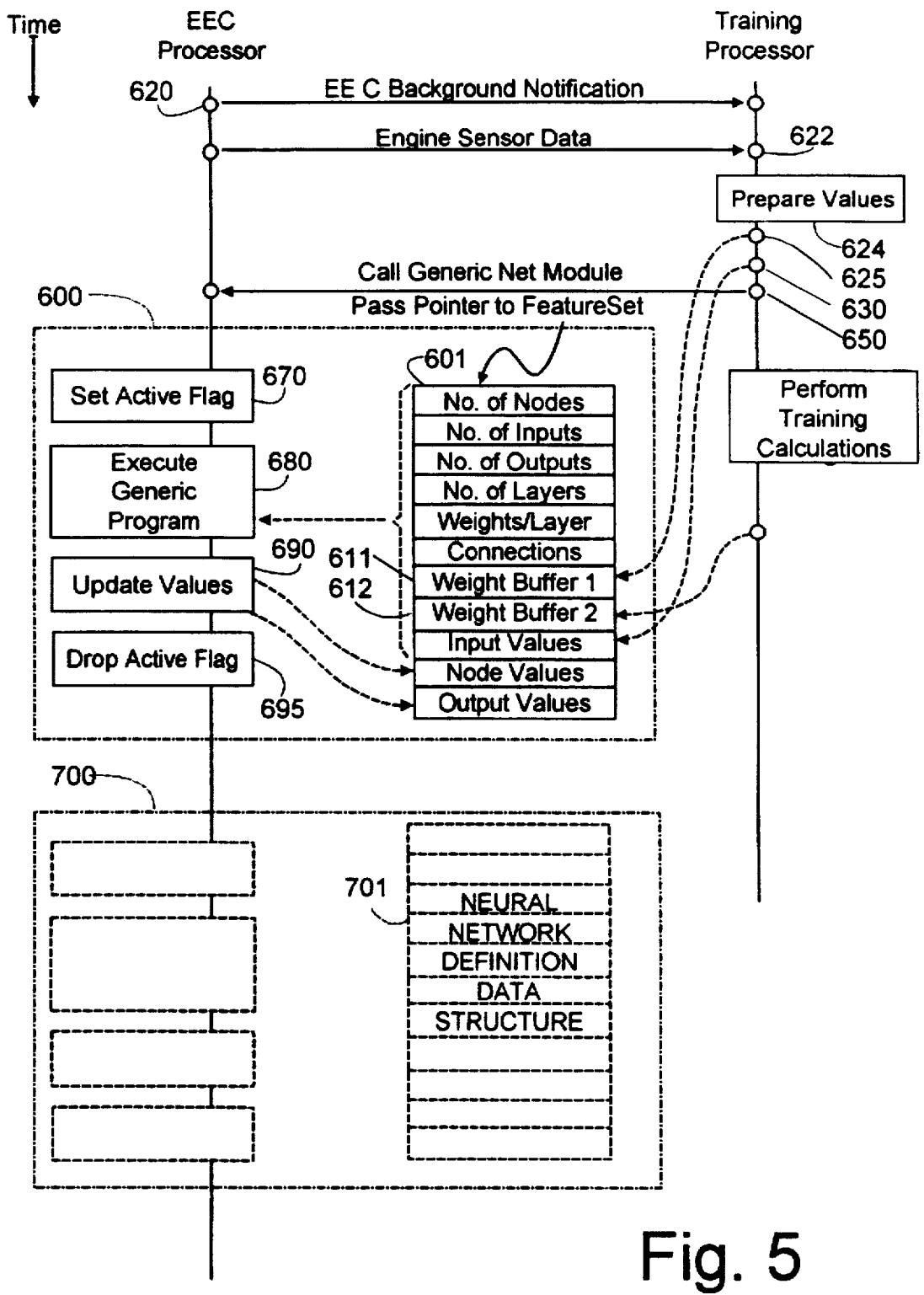
FIG. 5 is a timing and execution flow diagram depicting the manner in which the engine control processor executes asynchronously with the training processor during the training period.

FIG. 5 illustrates the manner in which the generic neural network execution module implemented by the EEC processor operates cooperatively and asynchronously with the training processor during calibration. In the diagram, events which occur first are shown at the top of the chart, processing steps executed by the EEC module 20 are shown at the left, and steps executed by the external training processor 35 are shown at the right. Data exchanges between the two processors take place via the shared memory unit 30 and largely, although not exclusively, via network definition data structures which are accessible to both processors.

In FIG. 5, two such network definition structures for two different networks (e.g., the open loop and closed loop networks) are implemented by two separate neural network processing routines 600 and 700 executed by the same generic neural network program running on the EEC processor which respectively manipulate values in the network definition data structures 601 and 701. As seen in detail for the data structure 601, each holds information in memory cells at predetermined offsets from the beginning address for the structure, and the stored information includes data fully defining the network architecture, including the number, organization and weighted interconnections of the network nodes. The network definition structure further stores current network state information including input and output values for the network, as well as current output values for each node (needed by the training processor during calibration). The weights themselves are stored within the structure in a double buffering area consisting of two storage areas seen at 611 and 612 in FIG. 5.

The generic execution module is implemented as a subroutine callable as a background procedure during the normal operation of a deployed vehicle. In the training mode, the generic execution module is initiated at step 620 when the EEC informs the training processor (for example, by posting a flag to the shared memory) that the EEC mainline program has entered a background state and is available to perform neural network processing. The training processor then obtains engine sensor data at 622 from the shared memory and, at step 624, prepares that data in proper format for use by the training algorithm and by the generic execution module.

If it has not already done so, the training module loads initial network weights into the first weight buffer 611 as indicated at 625. Initial weight values may be selected by conventional calibration strategies and are thereafter optimized by the operation of the training algorithm. Zero weight values may be used for those networks which are not yet trained (e.g. the weights in a second network definition structure such as the structure 701), with the EEC processor performing processing (e.g. in a routine 700) on these zero values to emulate normal timing, with the resulting controls being ultimately replaced by useful controls computed by conventional productions strategies and then replaced by optimized values during training.

With suitable weights in the data structure 601, either from production values or from prior training cycles, the training processor then loads the current network input values to be processed by the neural network into the data structure 601 as indicated at step 630.

At step 650, the training processor issues a request to the generic execution module to perform the generic neural net processing subroutine (performed by the EEC module 20), passing a pointer to the data structure 601 and thereby making all of the information it contains available to the subroutine 600 which begins execution at 660 as seen in FIG. 5.

The generic neural net routine first sets an active flag in the shared memory at step 670. As long as this active flag continues to be set, the executing training processor is informed that neural net processing of the definition data 601 is underway. The training processor, which may be concurrently executing the training algorithm, is accordingly notified that values in the structure 601 (other than the values in the inactive double buffer weight storage area) should not be altered.

At step 680, the generic neural network processing is performed utilizing the network definition data and weights, along with the current input values, in structure 601 to produce the output signals which, at the conclusion of neural network processing, are stored at step 690 into the data structure 601, thus updating both the output signals (which are available to the EEC for conventional control processing) and the internal network output node values for use by the training processor while executing the training calculations as indicated at the right at 694. The subroutine 600 indicates its successful completion by dropping the active flag at 620, thereby advising the training processor that the values in the network definition data structure 601 are available for use during the next training cycle.

As indicated at 700 in FIG. 5, the generic neural network execution routine, when supplied with a different network definition data structure 701, implements an entirely different neural network function. Thus, a single generic control program executes entirely in software without requiring any change to the generic execution module hardware or firmware.

It is to be understood that the embodiment of the invention which has been described is merely illustrative of the principles of the invention. Numerous modifications may be made to the apparatus and methods which have been described without departing from the true spirit and scope of the invention.

What is claimed is:

1. Apparatus for controlling the air/fuel mixture ratio of the combustibles delivered to an internal combustion vehicle engine, said apparatus comprising, in combination:

a plurality of sensors coupled to said engine for producing a plurality of input signal values each indicative of a predetermined variable engine operating condition, a first one of said input signal values being indicative of the oxygen level in the exhaust gases produced by said engine;

a electronic engine control processor coupled to said sensors and programmed to execute at least one neural network signal translation algorithm for converting said input signal values into a plurality of intermediate node output values and an output signal value indicating a controlled fuel command in accordance with network weight values, fuel delivery control means responsive to said output signal value for adjusting the rate at which fuel is delivered to said engine to achieve said controlled air/fuel mixture ratio;

data storage means coupled to said control processor for storing said input signal values, said intermediate node output values, said output signal value, and said weight values; and a training processor external to said control processor and coupled to said data storage means for modifying said weight values, said training processor including:

monitoring means responsive to said input signal values for comparing said controlled air/fuel mixture ratio with a predetermined desired air/fuel mixture ratio which provides substantially stoichiometric engine operation, and means responsive to said monitoring means for varying at least selected ones of said weight values such that said controlled air/fuel mixture ratio more nearly matches said predetermined desired air/fuel mixture ratio.

2. Apparatus as set forth in claim 1 wherein said means responsive to said control signal for adjusting the rate at which fuel is delivered to said engine includes closed loop control means responsive to a first one of said input signal values for varying said fuel delivery rate to reduce deviations in said controlled air/fuel mixture ratio from said desired air/fuel mixture ratio.

3. Apparatus for controlling a vehicle engine as set forth in claim 2 wherein said neural network signal translation algorithm includes recurrent processing means for combining said input signals with delayed ones of said intermediate output values.

4. Apparatus for controlling said vehicle engine as set forth in claim 3 wherein said means for varying at least selected ones of said weight values comprises:

dynamic gradient processing means for indicating the rates of change of said controlled air/fuel mixture ratio with respect to selected ones of said input signal values, and means for varying said weights in accordance with said rates of change such that said controlled air/fuel mixture ratio more nearly matches said desired air/fuel mixture ratio.

5. Apparatus for controlling said vehicle engine as set forth in claim 4 wherein said means for varying said weights employs a decoupled extended Kalman filter training algorithm for varying said weights in accordance with said rates of change.

6. Apparatus as set forth in claim 4 wherein said dynamic gradient processing means indicates the rates of change of said controlled air/fuel mixture ratio with respect to selected ones of said input signal values by processing said input signal values by means of a predetermined identification network algorithm previously trained by off-line processing to model the relationship between said input signals and said controlled air/fuel mixture ratio.

7. Apparatus for controlling the air/fuel mixture ratio supplied to an internal combustion vehicle engine, said apparatus comprising, in combination:

a plurality of sensors coupled to said engine for producing a plurality of input signal values each indicative of a predetermined variable engine operating condition including a first input signal value indicative of the oxygen level in the exhaust gases produced by said engine;

a electronic engine control processor coupled to said sensors and programmed to execute open loop and closed loop neural network signal translation algorithms for converting said input signal values into a plurality of intermediate node output values and an output signal value indicating a controlled fuel command in accordance with a plurality of network weight values, means responsive to said output signal value for adjusting the rate at which fuel is delivered to said engine to achieve a controlled air/fuel mixture ratio;

data storage means coupled to said control processor for storing said input signal values, said intermediate node output values, said output signal value, and said weight values; and a training processor external to said control processor and coupled to said data storage means for modifying said weight values, said training processor including:

monitoring means responsive to said input signal values for comparing said controlled air/fuel mixture ratio with a predetermined desired air/fuel mixture ratio which provides substantially stoichiometric engine operation, and means responsive to said monitoring means for varying at least selected ones of said weight values such that said controlled air/fuel mixture ratio more nearly matches said predetermined desired air/fuel mixture ratio.

8. Apparatus for controlling a vehicle engine as set forth in claim 7 wherein said open loop neural network signal translation algorithm translates a first set of said input signals into said output signal indicating a base transient air fuel ratio, and wherein said closed loop neural network signal translation algorithm translates a second set of said input signals into a closed loop correction value, and wherein said control processor further includes means for forming said output value indicating said controlled air/fuel mixture ratio from the additive combination of said base transient fuel command and said closed loop correction value.

9. Apparatus as set forth in claim 8 wherein said second set of input signal values includes said first input signal value indicative of the oxygen level in the exhaust gases produced by said engine, wherein said vehicle is equipped with a throttle whose position is manipulatable by the drive, and wherein said first set of input signal values includes at least a second input signal value indicative of the position of said throttle.

10. Apparatus for controlling said vehicle engine as set forth in claim 9 wherein said means for varying at least selected ones of said weight values comprises:

dynamic gradient processing means for indicating the rates of change of said controlled air/fuel mixture ratio with respect to selected ones of said input signal values, and means for varying said weights in accordance with said rates of change such that said controlled air/fuel mixture ratio more nearly matches said desired air/fuel mixture ratio.

11. Apparatus for controlling said vehicle engine as set forth in claim 10 wherein said means for varying said weights employs a decoupled extended Kalman filter training algorithm for varying said weights in accordance with said rates of change.

12. Apparatus as set forth in claim 11 wherein said dynamic gradient processing means indicates the rates of change of said controlled air/fuel mixture ratio with respect to selected ones of said input signal values by processing said input signal values by means of at least one predetermined identification neural network having weights predetermined by previous offline processing to model the relationship between said input signals and said controlled air/fuel mixture ratio.

13. The method of training a neural network to control the air/fuel mixture ratio of the cumbustibles supplied to the intake of an internal combustion engine, said neural network being implemented by an electronic engine control processor connected to receive input signal values indicative of the operating state of said engine and being further connected to supply output signals to control the operation of said engine, said method comprising the steps of:

- interconnecting an external training processor to said electronic engine control processor such that said external training processor can access said input signal values,
- generating and storing a data structure consisting of an initial set of neural network weight values,
- operating a representative internal combustion engine and its connected electronic engine control processor over a range of operating conditions,
- concurrently with the operation of said representative engine, executing a neural network control program on said external training processor to process said input signal values into an output fuel rate control value in accordance with the values stored in said data structures,
- concurrently with the operation of said representative engine, utilizing said fuel rate control value to control the rate at which fuel is delivered to said representative engine,
- concurrently with the operation of said representative engine, executing a neural network training program on said external training processor to progressively alter at least selected values in said data structure to modify the results produced during the execution of said neural network training program,
- evaluating the operation of said representative engine to indicate when a desired operating behavior is achieved, and
- utilizing the values in said data structure at the time said desired operating behavior is achieved to control the execution of said neural network control program on said electronic engine control processor to control production engines corresponding to said representative engine.

* * * * *